Figure 1:
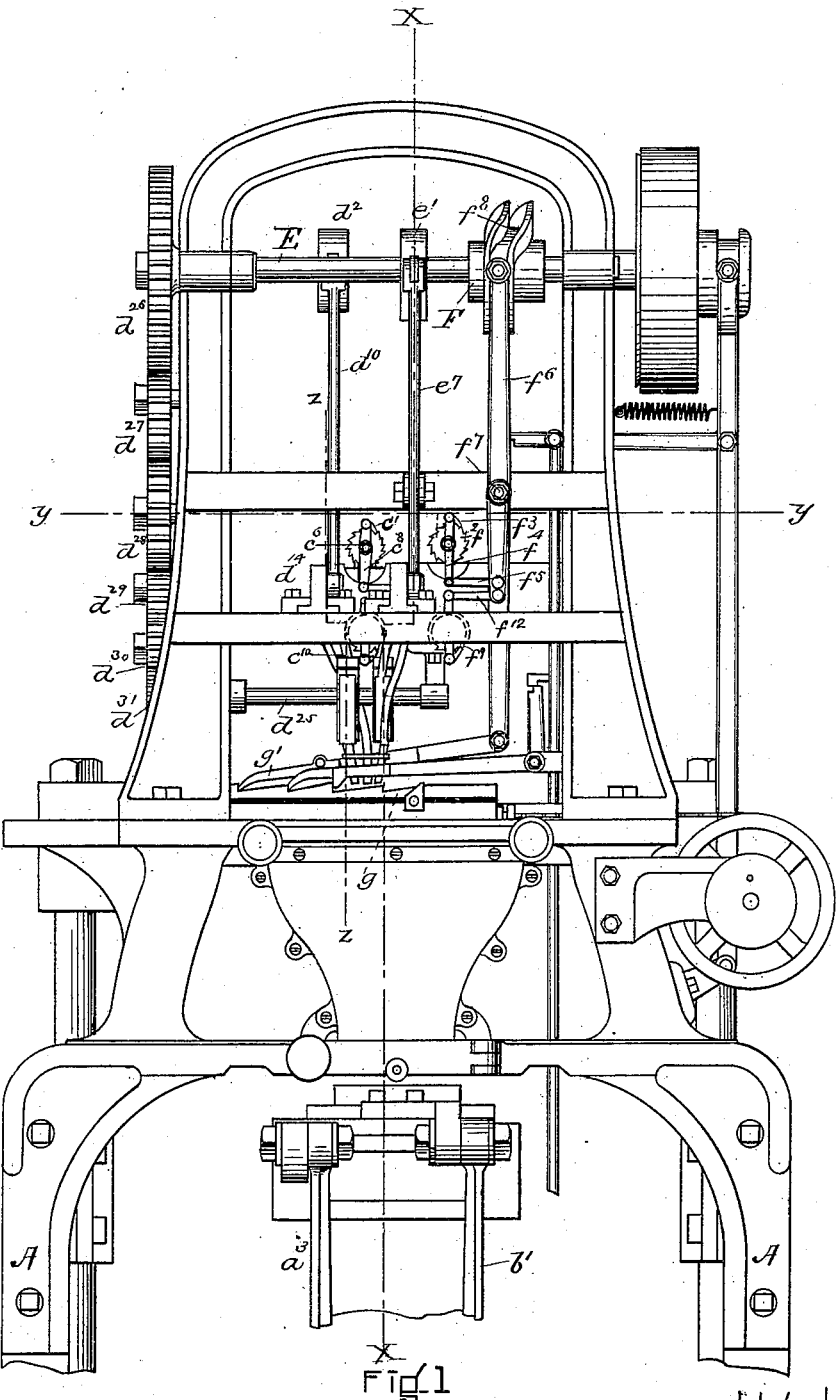

(No Model.) 12 Sheets—Sheet 1.

F. F. RAYMOND, 2d.
NAIL MAKING, DISTRIBUTING, AND DRIVING DEVICE.

No. 356,552. Patented Jan. 25, 1887.

WITNESSES.
J. M. Dolan.
Fred. B. Dolan.

INVENTOR.
F. F. Raymond (No Model.)  12 Sheets—Sheet 3.

F. F. RAYMOND, 2d.
NAIL MAKING, DISTRIBUTING, AND DRIVING DEVICE.

No. 356,552.  Patented Jan. 25, 1887.

WITNESSES.
J. M. Dolan.
Fred. B. Dolan.

INVENTOR.
F. F. Raymond 2d (No Model.) 12 Sheets—Sheet 8.
F. F. RAYMOND, 2d.
NAIL MAKING, DISTRIBUTING, AND DRIVING DEVICE.
No. 356,552. Patented Jan. 25, 1887.
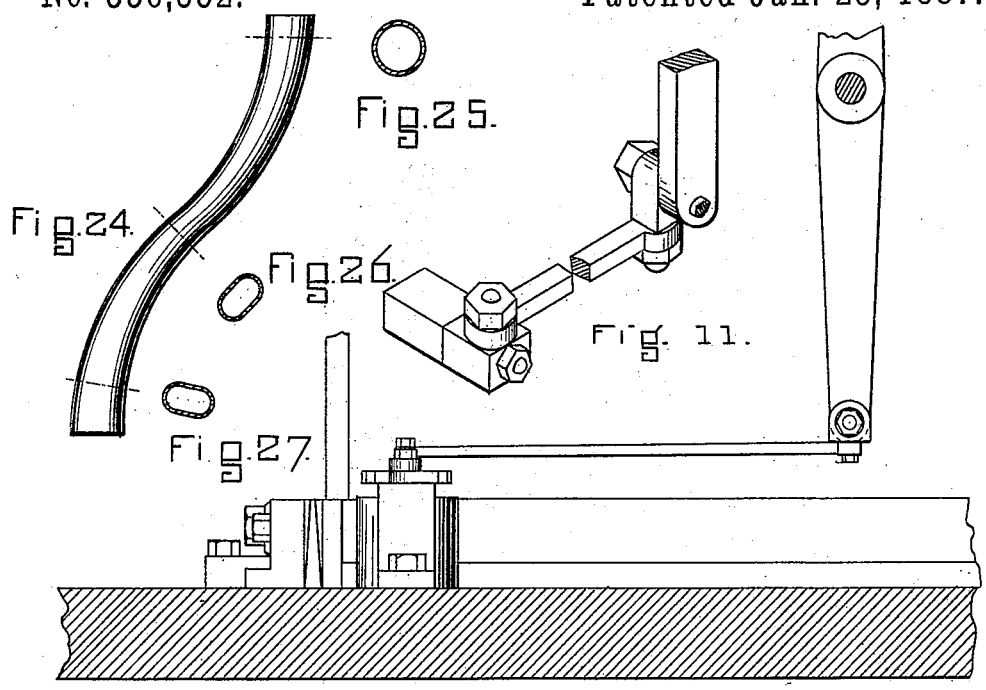
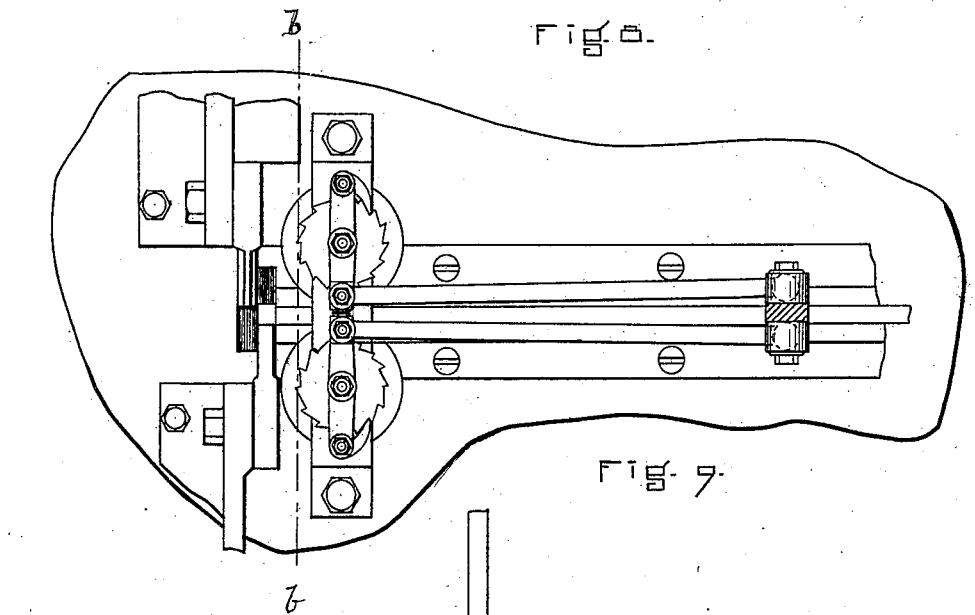
WITNESSES. INVENTOR.
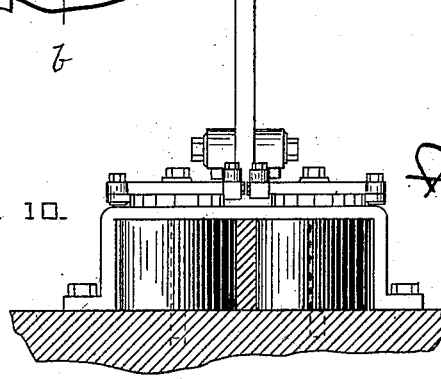
N. PETERS, Photo-Lithographer, Washington, D.C.

(No Model.)
12 Sheets—Sheet 9.
F. F. RAYMOND, 2d.
NAIL MAKING, DISTRIBUTING, AND DRIVING DEVICE.
No. 356,552.
Patented Jan. 25, 1887.
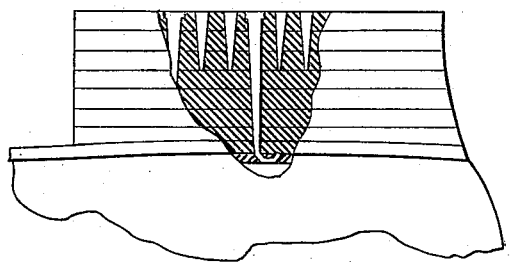
Fig. 12.
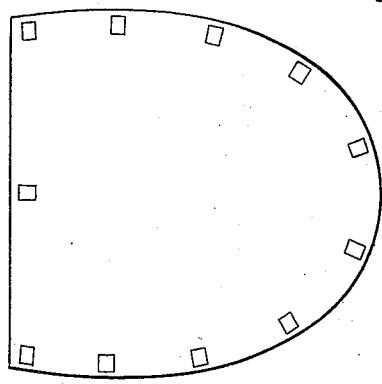
Fig. 13.
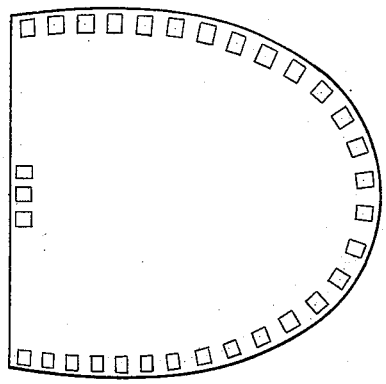
Fig. 14.
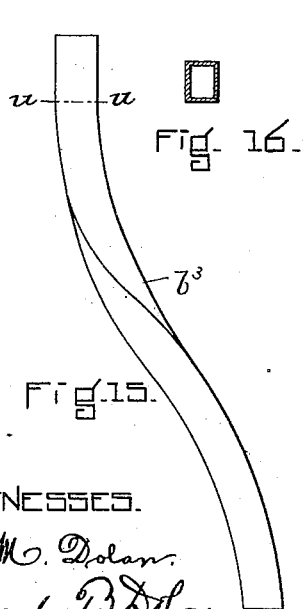
Fig. 15.
Fig. 16.
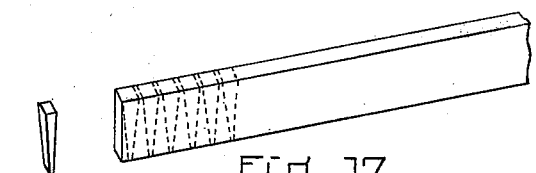
Fig. 17.
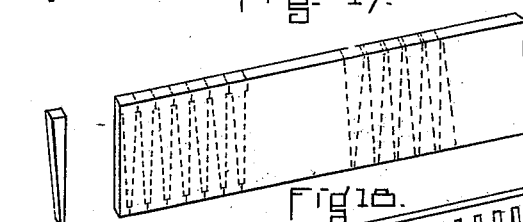
Fig. 18.
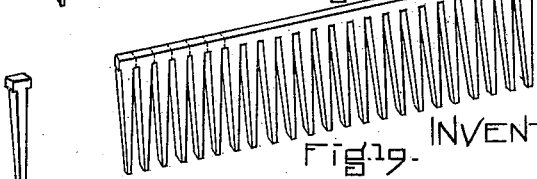
Fig. 19.
WITNESSES.
J. M. Dolan.
Fred. B. Dolan.
INVENTOR
F. F. Raymond (No Model.) 12 Sheets—Sheet 10.

F. F. RAYMOND, 2d.
NAIL MAKING, DISTRIBUTING, AND DRIVING DEVICE.

No. 356,552. Patented Jan. 25, 1887.

WITNESSES. INVENTOR.

(No Model.) 12 Sheets—Sheet 11.

F. F. RAYMOND, 2d.
NAIL MAKING, DISTRIBUTING, AND DRIVING DEVICE.

No. 356,552. Patented Jan. 25, 1887.

WITNESSES.
J. M. Dolan
Fred. B. Dolan.

INVENTOR
F. F. Raymond (No Model.)  12 Sheets—Sheet 12.

F. F. RAYMOND, 2d.

NAIL MAKING, DISTRIBUTING, AND DRIVING DEVICE.

No. 356,552.  Patented Jan. 25, 1887.

WITNESSES.
J. M. Dolan
Fred. B. Dolan

INVENTOR.
F. F. Raymond 2d

UNITED STATES PATENT OFFICE.

FREEBORN F. RAYMOND, 2D, OF NEWTON, MASSACHUSETTS.

NAIL MAKING, DISTRIBUTING, AND DRIVING DEVICE.

SPECIFICATION forming part of Letters Patent No. 356,552, dated January 25, 1887.

Application filed November 8, 1886. Serial No. 218,364. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail Making, Distributing, and Driving Devices, of which the following is a full, clear, and exact description, reference being had to the accompanying drawings, forming a part of this specification, in explaining its nature.

The invention relates to a machine arranged or organized to make nails of different lengths or varying in length, to distribute them into a predetermined line or arrangement for driving, and for delivering them in this predetermined form or arrangement to the nail-driving devices; and it comprises as a means for carrying the invention into effect the arrangement of mechanism for cutting from two nail strips or plates of varying widths separate nails, in the order desired, and for delivering these nails thus severed to a distributer, which receives, arranges, and delivers them in a prearranged order, so far as their lengths are concerned, and also, if desired, upon any prearranged line, and so that their heads shall have any desired relation to each other and to the line upon which they are driven.

The machine is represented in the drawings as organized to make, distribute, and drive a gang or group of fastenings into a heel, and it is organized to make two short nails or slugs and one long nail, and to distribute them so that the short and long nails shall be alternated in substantially this way—first a long nail and then two short nails.

Figure 2:
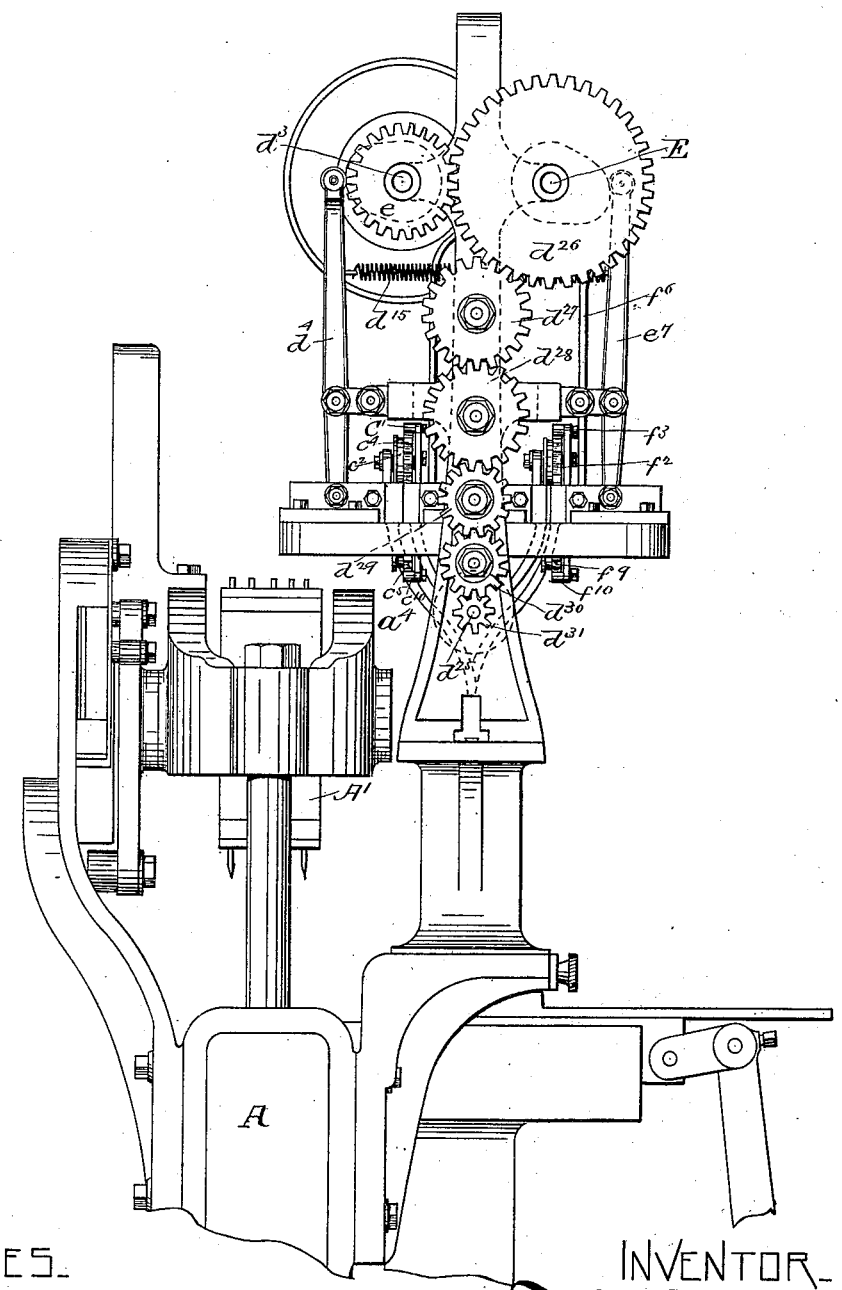
Figure 3:
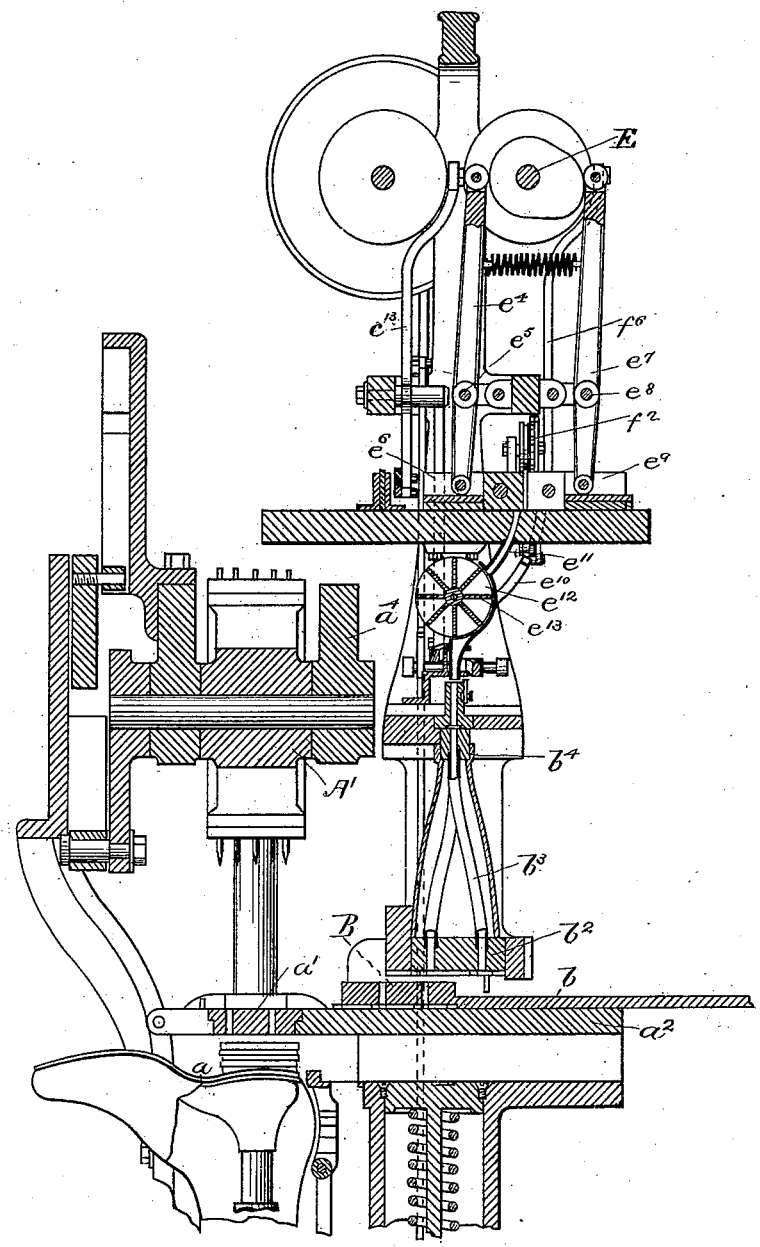
Figure 4:
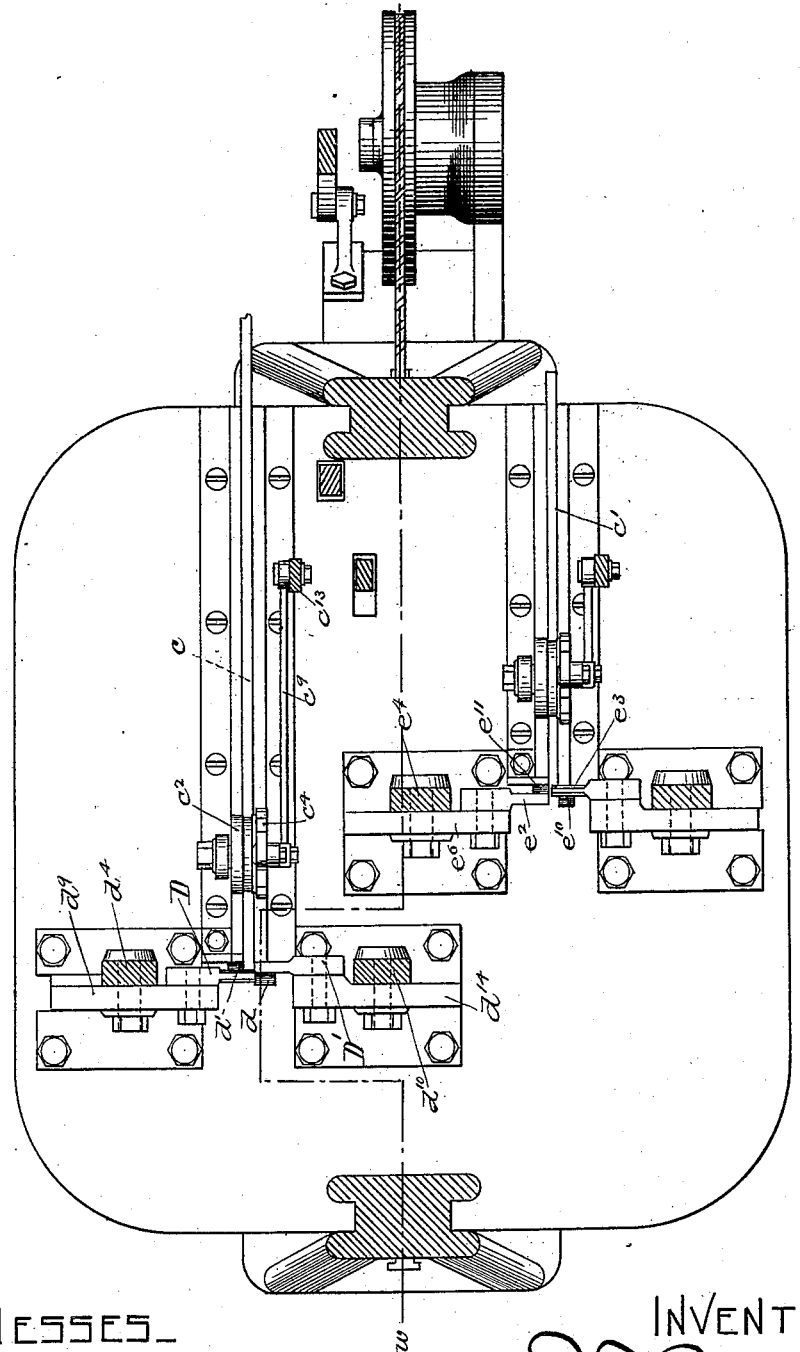
Figure 5:
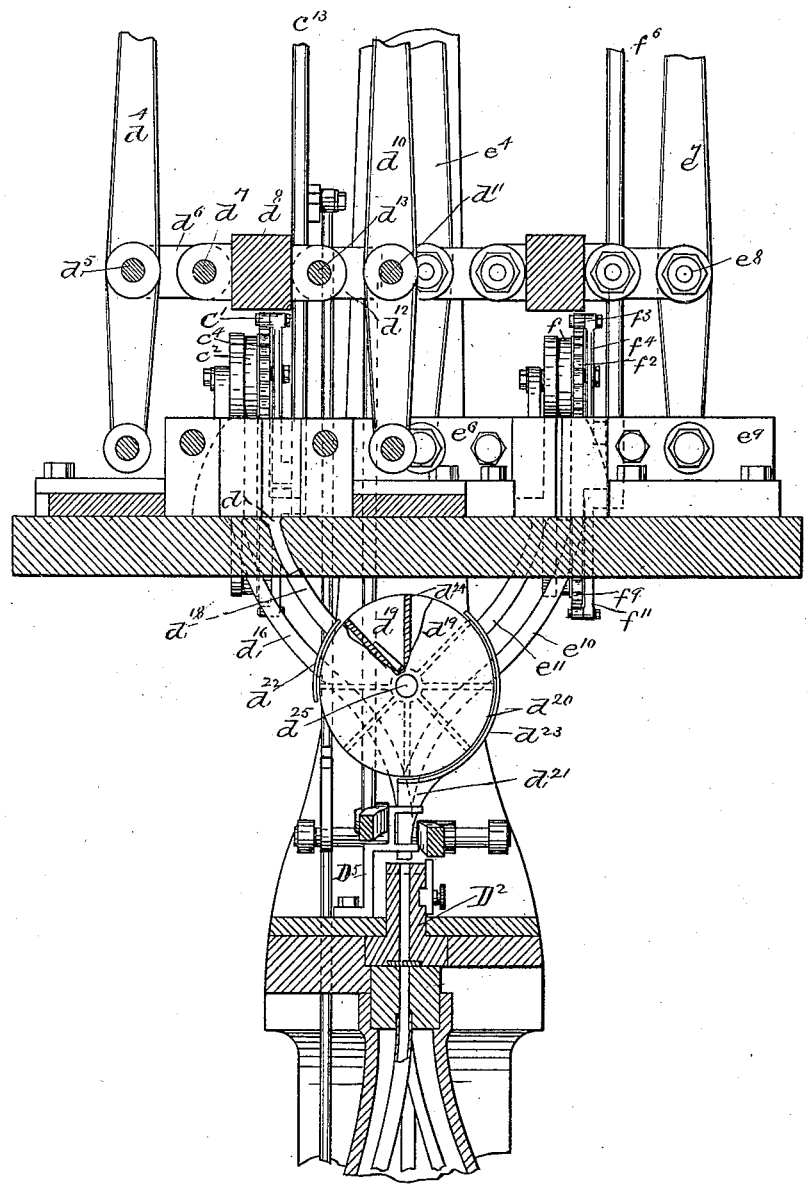
Figure 6:
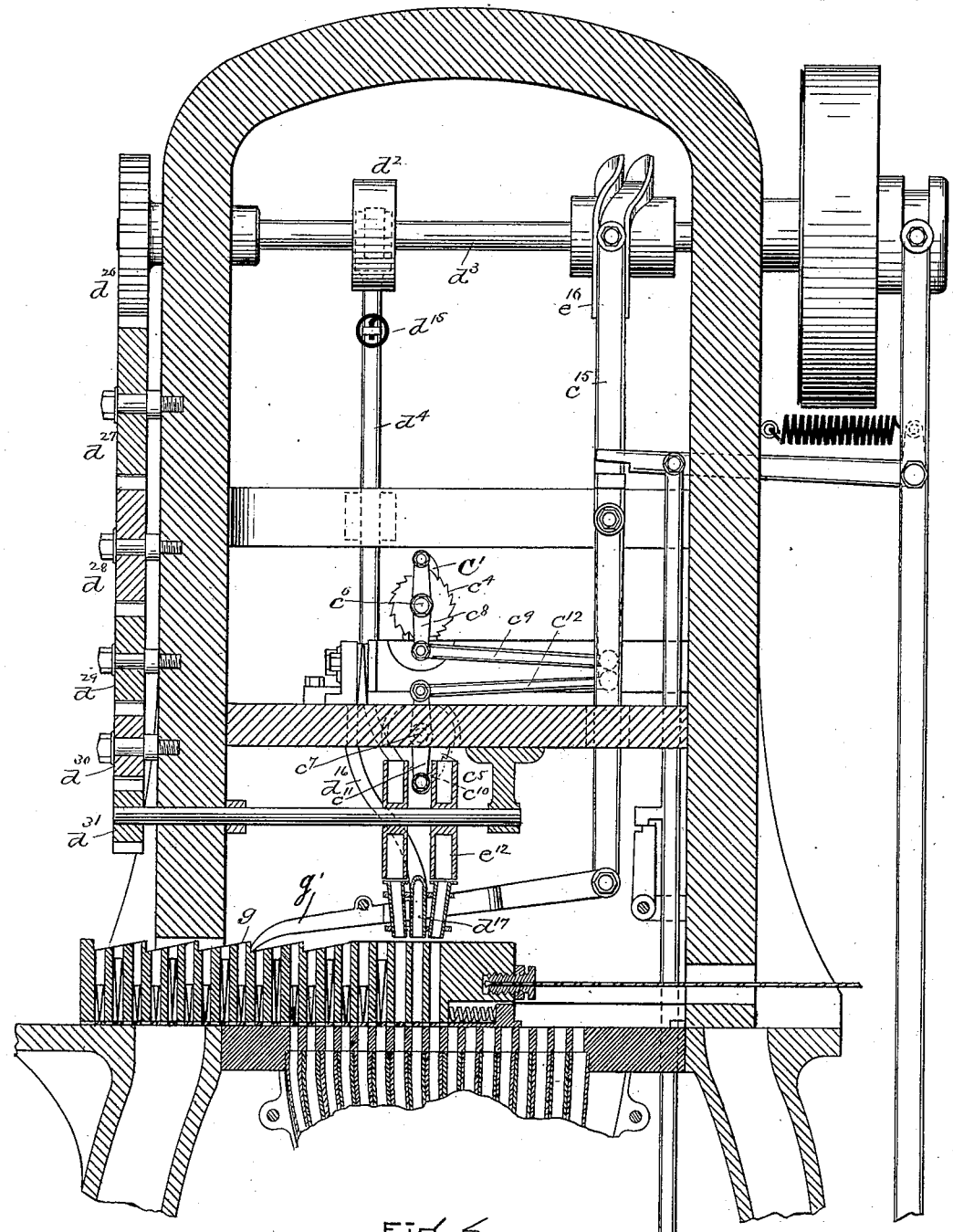
Figure 7:
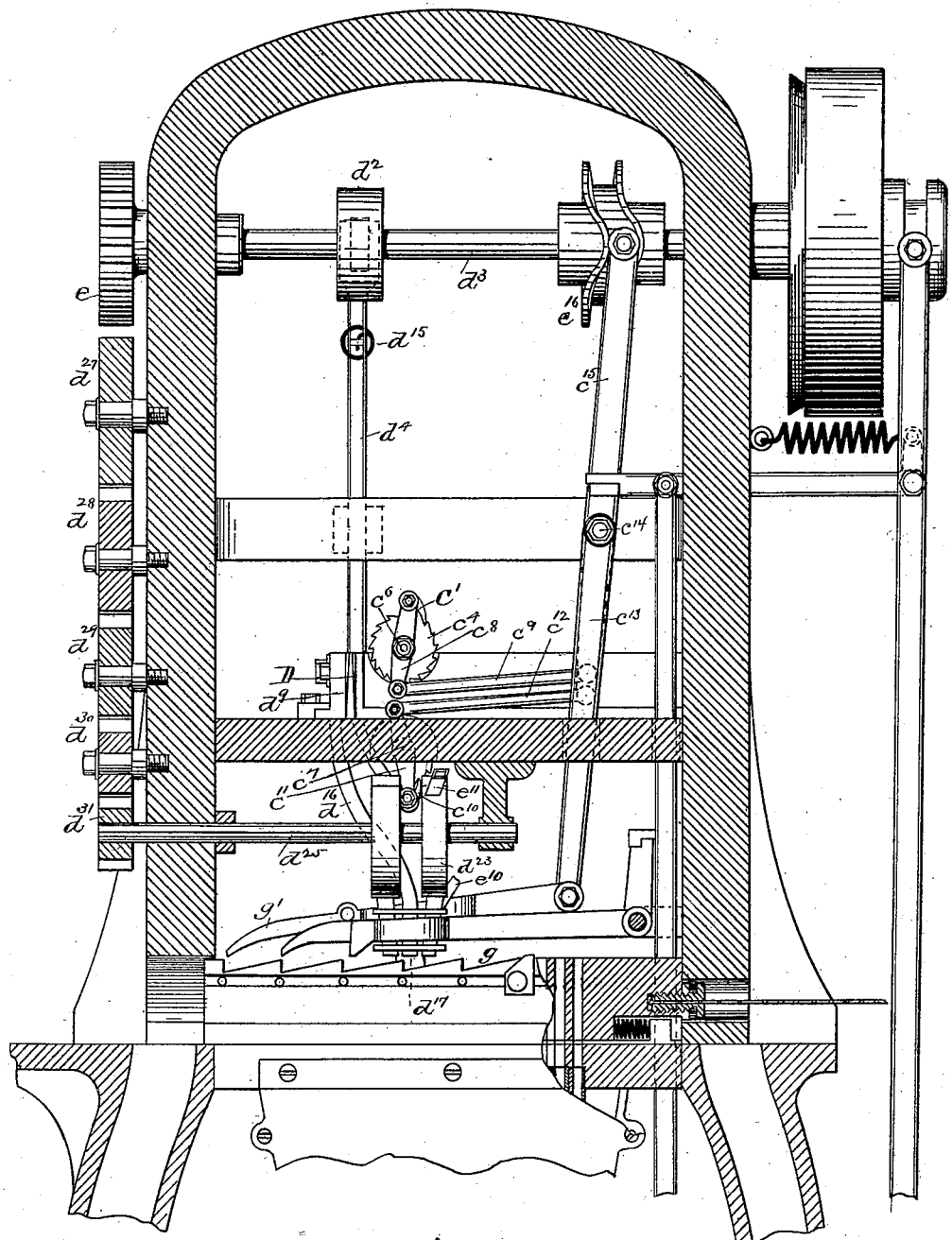
Figure 20:
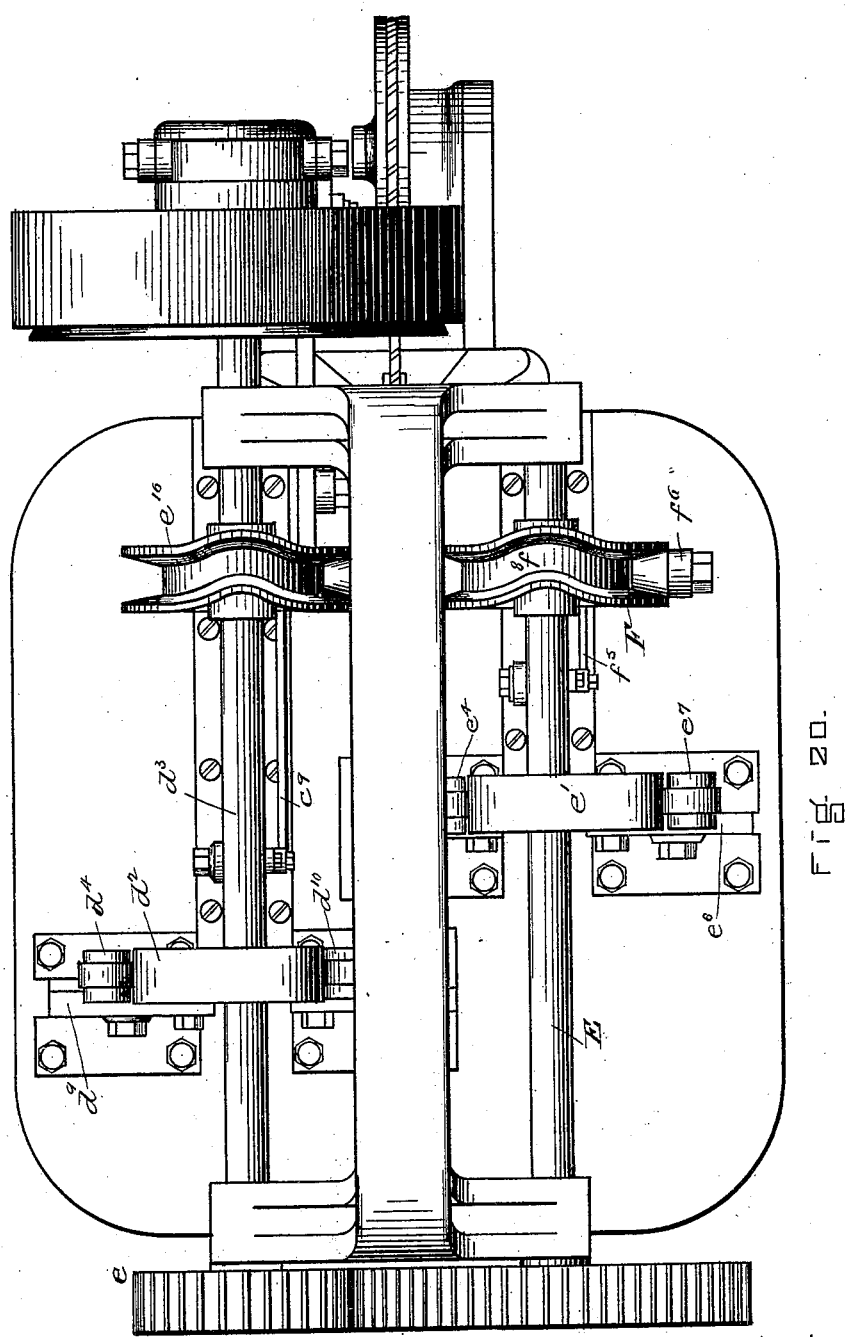
Figure 21:
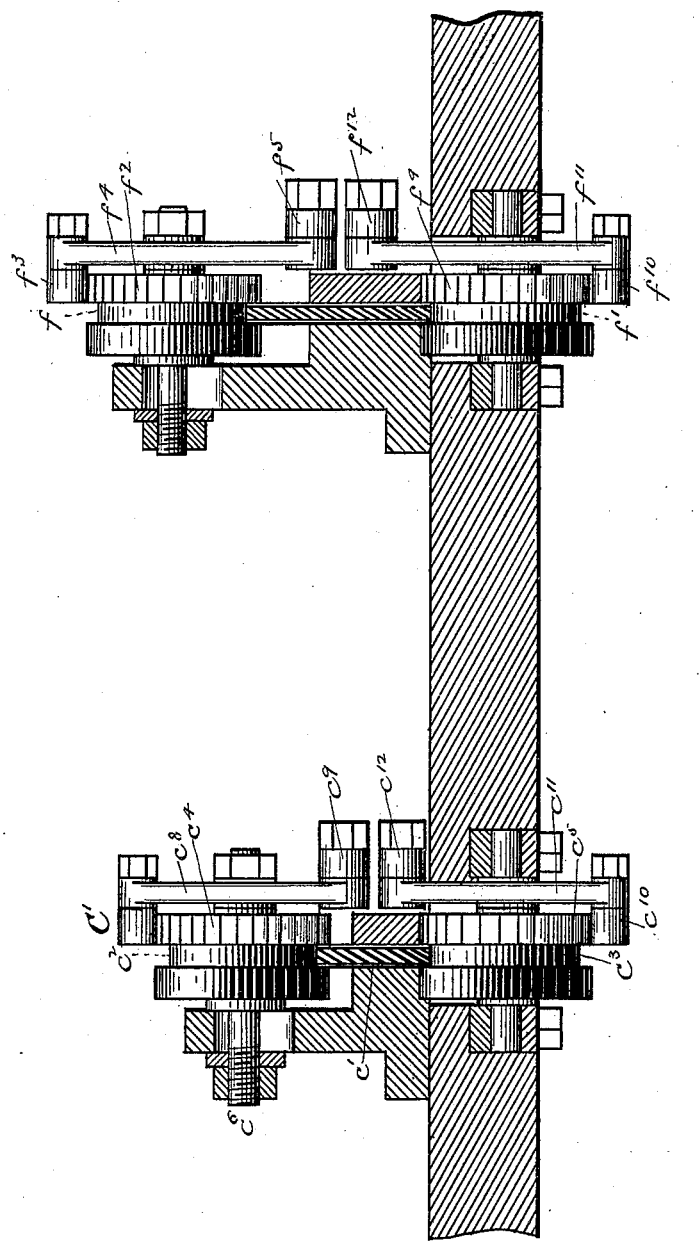
Figure 22:
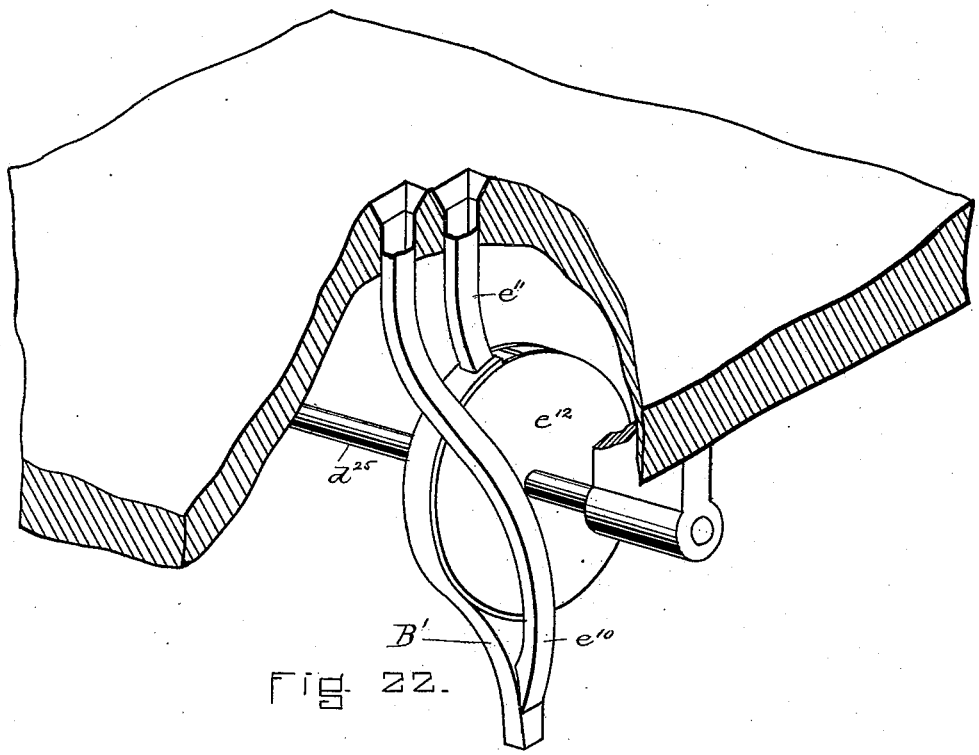
Figure 23:
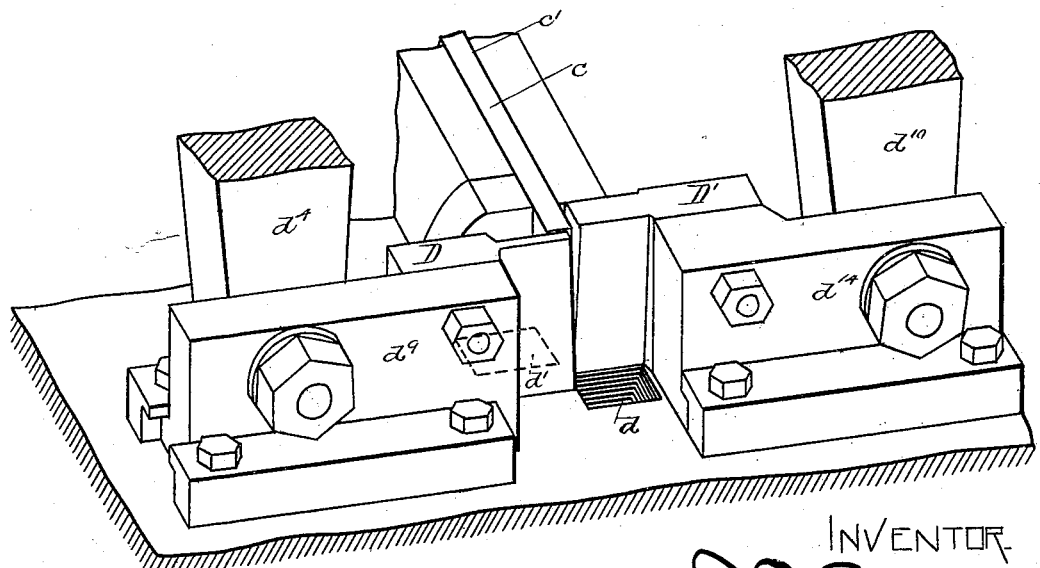

Figure 1 is a view in rear elevation of the central and upper part of a machine containing my invention. Fig. 2 is a view in right side elevation. Fig. 3 is a section on the line $x\ x$ of Fig. 1. Fig. 4 is a section, enlarged, on the line $y\ y$ of Fig. 1. Fig. 5 is an enlarged vertical section on the line $z\ z$ of Fig. 1, looking to the right. Fig. 6 is an enlarged section on the line $w\ w$ of Fig. 4. Fig. 7 shows the same view illustrated in Fig. 6 when the machine is at rest. Fig. 8 shows the employment of the side instead of the edge feed-rolls. Fig. 9 is a plan view of the parts represented in Fig. 8. Fig. 10 is a section on the line $b\ b$ of Fig. 9. Fig. 11 is a perspective view showing the universal joint employed on the levers of the side feed-rolls. Fig. 12 is a view in elevation of a heel, a portion thereof being broken out to show the driven nails. Fig. 13 is a plan view of a heel, showing the heads of the attaching or long nails. Fig. 14 is a plan view of an attached heel, showing the slugs in addition to the attaching-nails. Fig. 15 is a view of a distributer-tool to turn or twist it, as hereinafter described. Fig. 16 is a section upon the line $u\ u$ of Fig. 15. Fig. 17 is a perspective view of a nail-strip, showing a slug cut therefrom. Fig. 18 is a perspective view of a nail-strip, showing an attaching-nail cut therefrom. Fig. 19 is a perspective view of a comb-strip and a nail severed therefrom. Fig. 20 is a plan view of the machine. Fig. 21 is a view in cross-section, enlarged, to illustrate the plate-feeding devices. Fig. 22 is a detail view in perspective, enlarged, to illustrate a portion of the distributing mechanism. Fig. 23 is an enlarged view in perspective to illustrate the relation of the punches or severing devices in relation to each other and to the feedway of the machine. Fig. 24 is an elevation of one distributing-tube enlarged. Fig. 25 is a section on the upper dotted line of Fig. 24. Fig. 26 is a section on the middle dotted line of Fig. 24. Fig. 27 is a section on the lower dotted line of Fig. 24.

A is the main frame of the machine.

$a$ is the work-support; $a'$, the templet through which the nails are driven, and which preferably is mounted upon and carried by a sliding plate, $a^2$, adapted to be moved by a cam (not shown) and lever, $a^3$, at desired intervals.

A' is a revolving head supported by a crosshead, $a^4$, which is reciprocated preferably by mechanism described in Patent No. 322,562. The revolving head supports a gang or group of awls, a gang or group of drivers, and a spanker, and, if desired, a heel-breasting knife. It is automatically rotated to bring the various parts successively into operative position by mechanism substantially as described in Patent No. 322,562.

B is a nail-carrier. It is supported by the plate $a^2$, and is carried at the end of the plate $b$, which is reciprocated at the desired time by the cam (not shown) and lever $b'$ from the nailholder $b^2$ of the distributer to a position over the templet $a'$ to deliver its nails thereto. The distributer comprises a block, $b^2$, having holes arranged upon any desired line, and tubes $b^3$, connecting said holes with holes in a block, $b^4$, which are arranged on a straight line and at uniform distances from each other. This distributer is in most respects like that described in the Towns & Raymond Patent No. 346,137.

Above the distributer is arranged the nail-making devices and receiver-block.

The nail-making devices comprise two sets of nail-plate or strip-feeding devices, and where nails are cut from continuous or solid nail-plates—such as are shown in Figs. 17 and 18—two nail cutters or punches for each nail-strip are arranged at the end of each feedway and operated or caused to be moved one from one side and the other from the other side thereof, so that one shall cut a nail from the end of the strip and move it to a throat upon one side thereof, and the other shall cut the second nail and move it in an opposite direction to a throat arranged upon the opposite side of the feedway; and when nails are cut in this way from continuous nail-plates half the nails will be cut points down and half points up, and there must be used in connection with the throat which receives the nails points up a nail-reversing device or wheel, which shall turn the nails to bring their heads up as they are being fed to the distributer.

When nails of different lengths are arranged to be delivered in the order above specified—that is, one long and two short—it is necessary to provide three delivery-passages, through two of which short nails are fed and through the other of which a long nail is fed substantially at the same time, so that there is delivered to the nail receiving and transferring block almost simultaneously three nails—one long and two short—and this requires that the nail receiving and transferring block should be provided with a feed movement, which shall bring three of its holes in successive order in line with the three delivery-passages of the nail-supplying machine.

Of course I am describing now the organization of a machine when arranged to deliver one long and two short nails, as represented in the drawings; but I would not be understood as confining myself to this arrangement, because by varying the location of the throats and by using an additional throat nails may be delivered one long and one short, or otherwise.

$c$ is the feedway for the narrow nail-strip, or the strip from which the slugs or shorter nails are made, and $c'$ is the feedway for the wider strip or strip from which the attaching-nails are made.

$c^2$ $c^3$ represent the feed-rolls of the narrow strip. They are arranged vertically, one above the other, and the lower one is adapted to receive the bottom or lower edge of the strip and the upper one to bear upon it, so that the strip is held between the two rolls. These rolls are provided with an intermittent rotation to advance the strip, after the cutting of the two nails or slugs from the end thereof, by means of the ratchet-wheels $c^4$ $c^5$ upon the shafts $c^6$ $c^7$ of the said rolls $c^2$ $c^3$, respectively, the pawl C′, which engages the ratchet-wheel $c^4$ and is moved by the lever $c^8$ and link $c^9$, and the pawl $c^{10}$, which engages the ratchet-wheel $c^5$, the lever $c^{11}$, and link $c^{12}$. Both links are attached to a common operating-lever, $c^{13}$, which is connected at $c^{14}$ with the lever $c^{15}$, so that the rolls are simultaneously revolved, and the lever $c^{15}$ is operated or moved by the cam $c^{16}$ only when it is necessary to rotate the feed-rolls to advance the strip.

Arranged at the end of the feedway $c$ are the punches or cutters D D′. (See Fig. 4.) The cutter D is adapted to be moved horizontally across the end of the feedway to sever a nail from the end of the strip and move or carry it to the throat $d$. The cutter D′ is adapted to be moved across the feedway $c$ to sever a nail from the strip and move it to the throat $d'$. The cutter D forms a nail the point of which is downward, and the cutter D′ a nail the point of which is upward. The front edge of the cutter D′ acts as an abutment for holding the strip $c$ during the operation of the cutter or punch D, and the cutter or punch D, after it has severed the nail and transferred it to the throat $d$, remains substantially stationary as a barrier across the end of the feedway during the operation of the punch D′.

The punches or cutters are successively operated from a common cam, $d^2$, upon the shaft $d^3$—the punch D′ by means of the lever $d^4$, which is pivoted at $d^5$ to a short link, $d^6$, which is in turn pivoted at $d^7$ to the bar $d^8$, and which is connected at its lower end with the sliding block $d^9$, which carries the punch or cutter D. The punch or cutter D′ is reciprocated by means of the lever $d^{10}$, which is pivoted at $d^{11}$ to a link, $d^{12}$, which is in turn pivoted at $d^{13}$ to the bar or support $d^8$; and this lever $d^{10}$ is connected at its lower end with the slide-block $d^{14}$, carrying the punch or cutter D′. The upper ends of the two levers $d^4$ $d^{10}$ are held against their operating-cam by a spring, $d^{15}$.

The throat $d$ opens into a passage in the tube $d^{16}$, the lower end, $d^{17}$, of which is supported by a bracket, D⁵, (see Figs. 5 and 7,) and forms the nozzle through which the nail escapes to a passage in the nail receiving and delivery block D². The throat or passage $d$ opens into a passage in a short tube, $d^{18}$, (see Fig. 5,) which opens into the pockets or receiving-recesses $d^{19}$ of an intermittingly-rotated wheel, $d^{20}$. This wheel preferably has a series of receiving-pockets, each one of which is adapted to be brought successively beneath or in line with the discharge-opening of the tube $d^{18}$, to receive a nail, and it is provided with an intermittent rotation, whereby the pockets are advanced and each one stopped successively in a position to deliver its nail to the passage in the nozzle $d^{21}$. (See Fig. 5.)

There are arranged about the wheel the covering-plates $d^{22}$ and $d^{23}$, to prevent the nails from falling therefrom as it is rotated. The wheel is represented as divided by a number of partitions, $d^{24}$, (see Fig. 5,) into a number of sections or parts which I have termed the "receiving-pockets," and it is secured upon a shaft, $d^{25}$, which is rotated slowly by means of a train of gears comprising the gear $d^{26}$, (see Fig. 7,) on the shaft E, gear $d^{27}$, which meshes with the gear $d^{26}$, gear $d^{28}$, which meshes with the gear $d^{27}$, gear $d^{29}$, which meshes with the gear $d^{28}$, gear $d^{30}$, which meshes with the gear $d^{29}$, gear $d^{31}$, which meshes with the gear $d^{30}$, and is secured at the end of the shaft $d^{25}$.

It will be seen from the above description that the mechanism for making and delivering the shorter nails or slugs comprises a feeding mechanism, two reciprocating punches which are arranged at the end of the feedway and move in opposite directions, and two passages, one of which is arranged to receive the nails which are made head up and to deliver them without turning to the holes of the receiving-block $D^2$, and the other of which is arranged to receive the nails which are made point up and convey them to a turning device which reverses them and delivers them to a tube or passage, which also is arranged to deliver them into holes of the receiving-block D.

The mechanism for forming the long nails is in every respect like that for making the short nails, but it is timed to make but one long nail while two short nails are being made. This is accomplished by connecting its shaft E with the shaft $d^3$, which carries the driving and driven pulleys by means of the gear-wheel $e$ and the gear-wheel $d^{26}$. This shaft E has the cam $e'$ for operating the punches $e^2$ $e^3$ by means of the lever $e^4$, which is pivoted at $e^5$, and is connected at its lower end with the slide-block $e^6$, carrying the punch $e^2$, and the lever $e^7$, which is pivoted at $e^8$ and connected at its lower end with the block $e^9$, carrying the punch $e^3$. These punches $e^2$ $e^3$ are moved across the feedway $c'$ to sever nails from the end of the strip in alternate or successive order—first the punch $e^2$, which delivers nails to the passage $e^{10}$, and then the punch $e^3$, which delivers its nails to the passage $e^{11}$.

The passage $e^{10}$ extends directly to a position to deliver its nails into the holes of the receiving-block $D^2$. The passage $e^{11}$ is arranged to deliver nails into the pockets $e^{12}$ of the nail-turning wheel $e^{13}$. This nail-turning wheel is mounted upon the shaft $d^{25}$, and has slow rotation given it thereby, and delivers nails through the passage B' (see Fig. 22) to the lower end of the passage $e^{10}$, the tube or casing forming the passage $e^{10}$ being provided with an opening at its lower end to receive nails from the pockets of the turning-wheel. This lower part of the passage can thus be utilized where two or more short nails are made for every long nail, because the long nails will be delivered in successive order—first a nail through the passage $e^{10}$ and then a nail from the pocket of the turning-wheel $e^{13}$, and the two short nails and one long nail are delivered simultaneously to three holes of the receiving-block $D^2$, which, having received them, is advanced to bring three new holes in line with the holes of the nail-delivery passages.

The feeding mechanism for feeding the strip for making the long nails comprises the feed-rolls $f$ $f'$, the ratchet-wheel $f^2$, connected with the roll $f$, the pawl $f^3$ for engaging it, mounted upon the lever $f^4$, the link $f^5$, lever $f^6$, pivoted at $f^7$, the cam-groove $f^8$ in the cam-disk F upon the shaft E. The feed-roll $f'$ has a ratchet-wheel, $f^9$, and a feed-pawl, $f^{10}$, mounted upon a lever, $f^{11}$, connected with the lever $f^6$ by the link $f^{12}$, which is adapted to rotate it with an intermittent movement.

The nail-receiving block $D^2$ is like in every respect that described in the said Towns & Raymond patent, and is operated and tripped in the same way, the only difference being that its ratchet-teeth $g$ are longer, and the feed-pawl $g'$ given a longer throw, in order that it may move a distance three times as great as that given the Towns & Raymond delivery-block in order that three holes may be brought simultaneously in line with three delivery-passages upon each movement of the block.

The mechanism for automatically starting and stopping the machine is also like that described in said patent, and need not further be referred to here.

In Fig. 17 I have represented a view in perspective of the nail-plate for making short nails, showing in dotted lines the division of the plate into separate nails, and also representing one nail cut therefrom. These nails are often called "slugs," and are not intended to be driven through the heel, but only through the top lift and one or more lifts, as seen in Fig. 12.

In Fig. 18 I show the nail-plate for the long nails, representing in dotted lines the division of the plate into separate nails, and also showing the nail in perspective. These longer nails are for attaching the heel-blank to the soles of the boot or shoe, and they are driven sufficiently far apart to permit of the insertion between them of at least two short nails or slugs. (See Figs. 12 and 13.) The heads of the slugs should be of the same shape as those of the attaching-nails, so that the finished heel should have the nails set uniformly and regularly, as represented in Fig. 14.

In lieu of a nail-strip such as is shown in Fig. 18, a comb-strip, such as is represented in Fig. 19, may be employed, in which case only the punch $e^2$ would be operated; but if it were desired to deliver one attaching-nail for every two slugs, said punch, when thus used, should be moved twice as fast as it now is.

Where it is desired to set the nails so that their heads shall be at substantially a right angle to the edge of the finished heel, I make the tubes $b^3$, which form the passages between the upper plate, $b^4$, and the distributer, square or rectangular in cross-section, (see Figs. 14 and 15,) and turn them so that the passage is given a direction or curve sufficient to turn the nails while they are falling and deliver them with their greatest diameters at a right angle to the line of a finished heel into the holes of the holder $b^2$, which are shaped to thus receive and hold them.

In lieu of the feed-rolls which bear against the upper edges of the strips above described, I may use rolls mounted upon vertical shafts and arranged so that their surfaces extend into the feedway and so as to grasp between them the nail-plate. They are intermittingly revolved by the same mechanism used for rotating the large feed-roll. This form of construction is represented in Figs. 7, 8, 9, and 10.

In operation the nail-strips are placed or automatically fed to the feedways $c\ c'$, and the time of the machine is such that the punches D D' for forming the short nails or slugs are both operated to form two slugs, while one only of the punches $c^2\ c^3$ is operated to form one long attaching-nail. The nails thus formed are delivered through their respective passages, and such of them as require reversal reversed by the turning-wheels, and are delivered substantially simultaneously through the ends of the passages, which are arranged upon a straight line at a uniform distance apart to deliver the nails into three holes of the receiver $D^2$. The nail-plates are then simultaneously fed to their respective punches, and the receiver $D^2$ moved to bring three additional holes in line with the holes of the delivery-passages, and the machine continues to operate in this manner until the desired number of nails has been delivered to the receiving-block, when its feed-pawl is automatically released and it is automatically returned to deliver its nails to the distributer, and they are then conveyed from the distributer by a carrier to the nail-driving devices.

When tubes are used before forming the passages of the distributer, and it is desired to guide the nails so that their heads shall bear a predetermined relation to each other when delivered to the driving devices, I prefer that they be made of such size and shape that their openings at the top shall be circular, or large enough to receive the nails, regardless of the angle their heads may bear in relation thereto, and which passages are then reduced by flattening the tube to a diameter which shall be in width less than the greatest diameter of the head of the nail, so that in falling the nails are caused to be turned to bring their heads into any desired angle in relation to each other.

It will be observed that the loose nails as delivered by the nail making and turning devices to the distributer do not have any especial arrangement, and that if it is desired that the nails shall have a uniform relation to each other as driven it is necessary to turn them upon their longitudinal axes or centers as they are falling through the passages of the distributer-tubes, and until they are brought into the holding and guiding holes of the nail holder or carrier. This is especially requisite in flush-nailing, when it is desired that the nails shall have a regular or uniform relation to each other and to the edge of the heel; and, as above described, this is accomplished by the distributer, the tubes of which have passages the upper ends of which are sufficiently large to receive the nails, regardless of the relation which they bear to each other, and which are then reduced in width gradually and turned to form spiral guiding-passages, which first receive the nails and then turn them, regardless of their position in each hole, upon their vertical axes as they are falling through the tubes, and until they are guided or brought into the arrangement which it is desired that each shall bear to the edge of the heel and to all others.

In Figs. 14 and 15 of the drawings I have illustrated tubes especially adapted to receive and guide nails the heads of which are substantially square in cross section. For nails having rectangular cross-section the tubes must have the guiding-passages rectangular in shape, but at their upper ends must be large enough to receive the nails, regardless of the angle at which they enter the distributer.

Having thus fully described my invention, I claim and desire to secure by Letters Patent of the United States—

1. In a nail making, distributing, and driving machine, the combination of the nail-driving and nail-distributing devices with two nail-making devices, substantially as described, one of which is adapted to make shorter nails than the other, and both of which are connected with the distributer by nail-conducting passages, substantially as described.

2. The combination, in a nail making, distributing, and driving machine, of the nail-driving devices, a nail-distributer, and two devices for making nails, constructed substantially as described, and arranged to be simultaneously operated, and each of which comprises nail-stock feeding mechanism, plungers or punches for cutting nails from the nail-stock, and passages for delivering the nails as they are cut to the nail-distributing devices, substantially as described.

3. The combination, in a nail making, driving, and distributing machine, of the nail-making devices, the distributing mechanism, and two devices for making nails adapted to be simultaneously operated, each of which comprises the nail-stock feeding mechanism, two reciprocating punches adapted to be moved across the feedway in opposite directions to two throats or passages, the said throats or passages, one of which is arranged to convey the nails formed with their heads up directly to the distributer and the other of which is adapted to convey nails formed with their heads down to a turning device, and said nail-turning devices, substantially as described.

4. The combination, in a nail making, distributing, and driving machine, of the nail-driving devices, the nail-distributer, and a nail-making device comprising a nail-strip feeding mechanism, two punches arranged to be moved across the feedway of the machine in opposite directions to sever nails therefrom and advance them respectively to conducting holes or passages, one conducting hole or passage for conveying nails which are made with their heads uppermost, the other hole or passage which conveys the nails to a turning device, said turning-wheel having one or more pockets, and a passage adapted to receive nails from said turning device in an upright position and to convey them to the distributer, substantially as described.

5. In a nail making, distributing, and driving machine, the combination of two or more throats or passages adapted to receive nails and to deliver them simultaneously to a distributer, with said distributer having a slide-block, $D^2$, and means for moving said distributer in relation to said holes or passages with an intermittent movement of sufficient extent to bring unfilled holes in regular order in register with such throats or passages, substantially as described.

6. The combination of the passages $d^{16}$ $d^{18}$ with the turning device $d$, having one or more pockets into which the passage $d^{18}$ opens, and the passage $d^{21}$, arranged to receive nails from said turning-wheel, substantially as described.

7. The combination of the feedway $c$, the feed-rolls $c^2$ $c^3$, the punches D D′, the passages $d$ $d'$, the shaft $d^3$, the cam $d^2$, and the levers $d^4$ $d^{10}$, connecting the cam with the blocks carrying the said punches, substantially as described.

8. The combination of the shaft $d^3$, carrying a driving and driven pulley, and cams $d^2$ $e^{16}$, connected, substantially as specified, with the punches $e^2$ $e^3$, and the feed-rolls $b$ $b'$, substantially as described.

9. The combination of the shafts $d^3$ and E, connected with each other to be simultaneously moved, the feedways $c$ $c'$, the feed-rolls, the cam $d^{16}$ upon the shaft $d^3$, and a lever and connecting mechanism, substantially as specified, the punches D D′, movable across the end of the feedway $c$, a cam, $d^2$, and connecting mechanism, substantially as indicated, the feedway $c'$, its feed-rolls, a cam, $f^8$, on the shaft E, and connecting mechanism, substantially as specified, the punches $e^2$ $e^3$, movable across the end of the feedway $c'$, a cam, $e'$, upon the shaft E, and mechanism connecting the cam with said punches, the two groups of connecting-passages $d^{16}$ $d^{18}$ and $e^{10}$ $e^{11}$, and the two nail-turning devices $d^{20}$ and $e^{13}$, substantially as described.

10. The combination of a feedway through which nail-stock is adapted to be fed with two punches or severing devices, D D′, movable across the feedway from opposite sides thereof, substantially as and for the purposes described.

11. The combination of the punch D and devices for moving it in relation to the punch D′, substantially as specified, all as described.

12. The combination of the feedway $c$, the punch D, and escape-passage $d$ with the punch D′ and escape-passage $d'$, substantially as described.

13. In a nailing-machine for forming or cutting nails, heads, and points, devices for receiving nails and delivering them in groups of two or more with points down, comprising a passage, $d^6$, through which nails cut with their heads up are adapted to be fed, and the passage $d^{18}$, arranged to convey nails to a nail turning or reversing device, the said nail-turning device and passage $d^{21}$, substantially as described.

14. The combination of the passage $e^{10}$, the passage $e^{11}$, the nail turning device $e^{13}$, and the passage B′, adapted to receive nails from the turning device, and arranged to open into the passage $e^{10}$, substantially as described.

15. The combination of the nail-reversing device $d^{20}$, having the pockets $d^{19}$, with the covering-plates $d^{22}$ $d^{23}$, substantially as described.

16. The combination of the nail-delivery passages $d^{17}$, $d^{21}$, and $e^{10}$, with the traveling block $D^2$, having a line of nail-receiving holes, substantially as described.

17. The combination of two nail-turning devices connected, respectively, with the passages $d^{21}$ and $e^{10}$, with the said passages $d^{21}$ and $e^{10}$, and the passage $d^{16}$, with the traveling nail-receiving block $D^2$, substantially as described.

18. A nail-distributer for receiving and conducting loose nails, having one or more conducting-tubes, $b^3$, which tube or tubes have a guiding passage or passages square or rectangular in cross-section, as and for the purposes described.

19. A nail-distributer for receiving and conducting loose nails, formed of tubes $b^3$, having passages at their upper ends of sufficient size to receive the nails, regardless of the angle which their greatest diameter bears to the passages, and which passages are gradually changed in shape until they finally are of a shape which approximates the shape of the head of the nail, and which are also curved spirally, whereby the nails are caused first to be centered and then to be turned on their vertical axes as they fall through the tubes, substantially as described.

20. The combination, in a nail-distributer, of the plate $b^4$, tubes $b^3$, having round or circular openings at their tops and flattened below their tops to produce long but narrow passages, and the block $b^2$, substantially as described.

FREEBORN F. RAYMOND, 2D.

Witnesses:
J. M. DOLAN,
FRED. B. DOLAN.